United States Patent [19]

Morio et al.

[11] 4,115,820
[45] Sep. 19, 1978

[54] SYSTEM FOR REPRODUCING A VIDEO SIGNAL

[75] Inventors: Minoru Morio; Masahiro Kambara, both of Tokyo, Japan

[73] Assignee: Sony Corporation, Tokyo, Japan

[21] Appl. No.: 630,332

[22] Filed: Nov. 10, 1975

[30] Foreign Application Priority Data

Nov. 11, 1974 [JP] Japan .................................. 49-129687
Jan. 16, 1975 [JP] Japan .................................... 50-7375

[51] Int. Cl.² ........................................... H04N 5/795
[52] U.S. Cl. .......................................... 360/33; 358/4; 360/30
[58] Field of Search ................. 360/29, 30, 33; 358/4, 358/127

[56] References Cited

U.S. PATENT DOCUMENTS

| | | |
|---|---|---|
| 3,040,125 | 6/1962 | Dillenburger et al. ................. 360/30 |
| 3,230,306 | 1/1966 | Takayanagi ............................. 360/30 |
| 3,350,504 | 10/1967 | Takayanagi ............................. 360/30 |
| 3,402,256 | 9/1968 | Kinjo ...................................... 360/30 |
| 3,405,232 | 10/1968 | Morrow et al. ......................... 360/29 |
| 3,482,038 | 12/1969 | Warren ................................... 360/30 |

*Primary Examiner*—Raymond F. Cardillo, Jr.
*Attorney, Agent, or Firm*—Lewis H. Eslinger; Alvin Sinderbrand

[57] ABSTRACT

A system for reproducing video signals recorded on a magnetic recording medium as a suppressed-carrier modulated signal in which the video information is carried primarily on only one sideband and the frequency of the suppressed carrier is within the band occupied by the video signals prior to modulation. Jitter components in the reproduced signals are substantially cancelled out.

8 Claims, 48 Drawing Figures

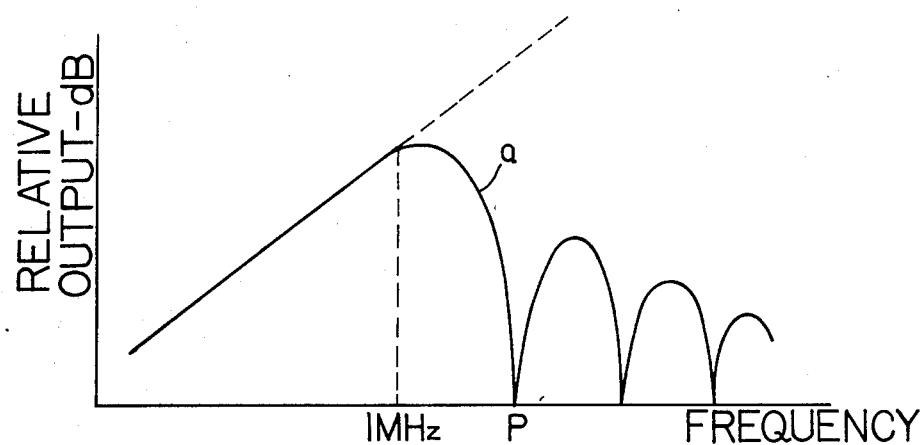
FIG. IA
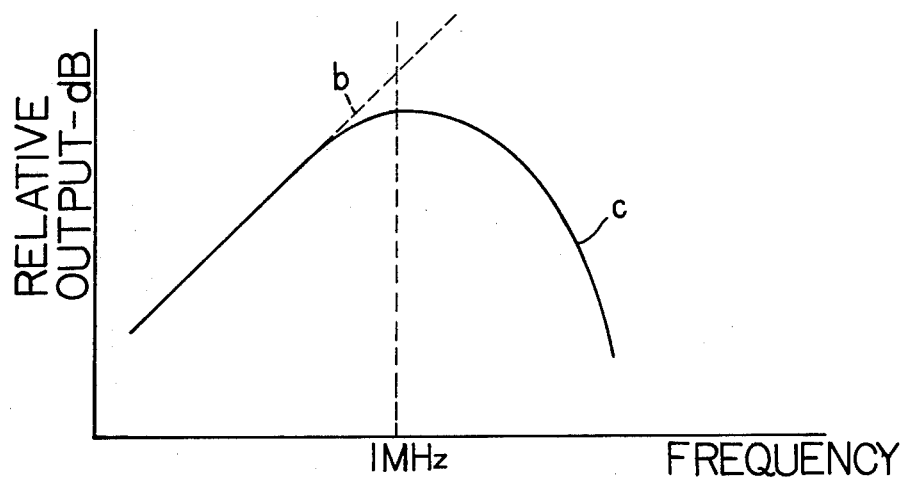
FIG. IB
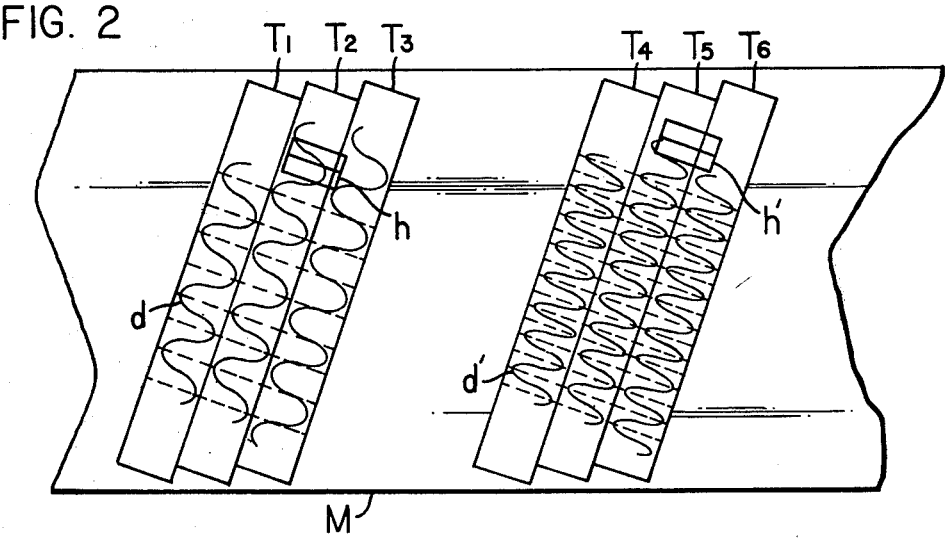
FIG. 2

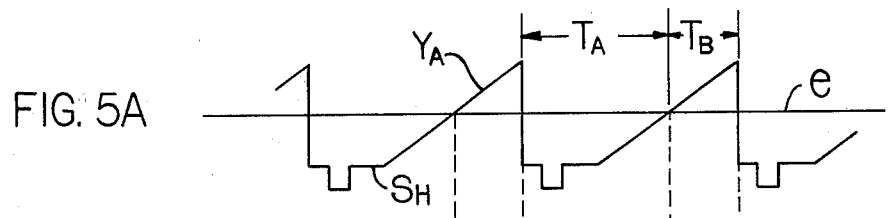
FIG. 5A
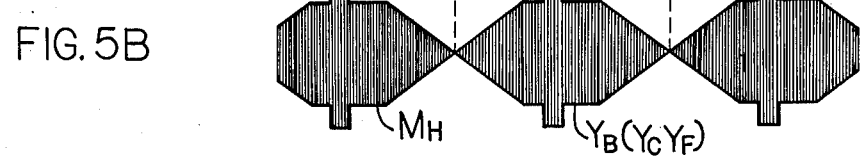
FIG. 5B
FIG. 5C
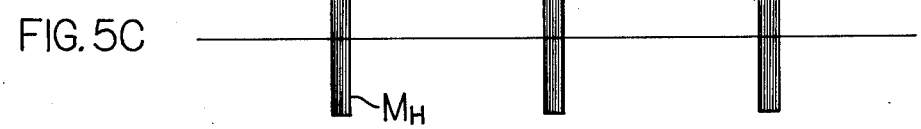
FIG. 5D
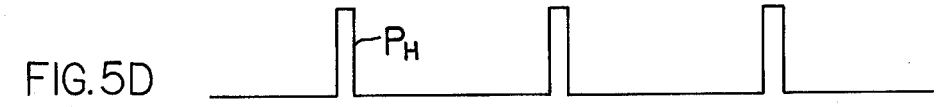
FIG. 5E
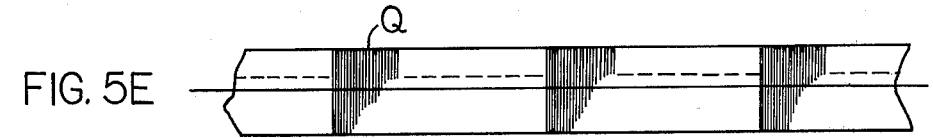
FIG. 5F
FIG. 5G
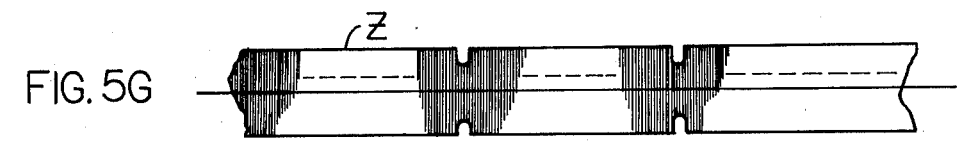
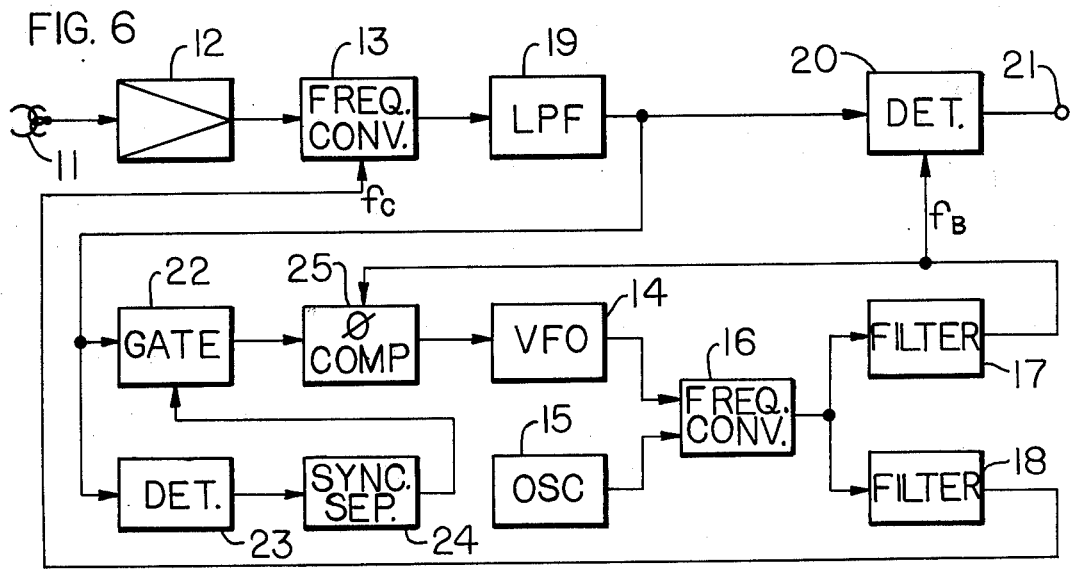
FIG. 6

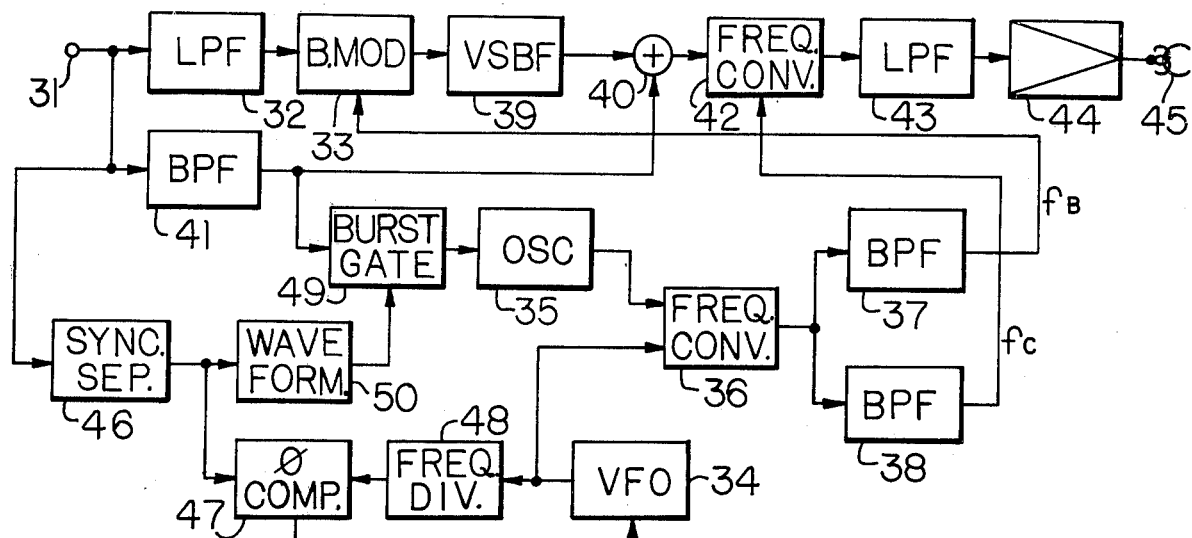
FIG. 7
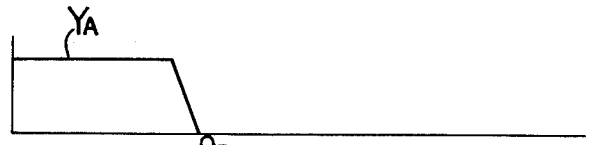
FIG. 8A
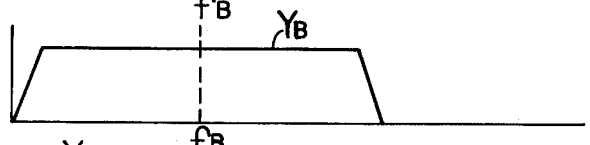
FIG. 8B
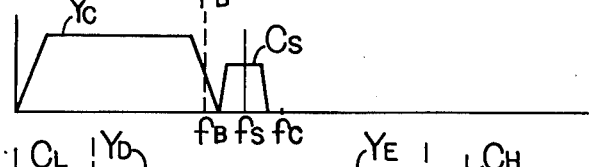
FIG. 8C
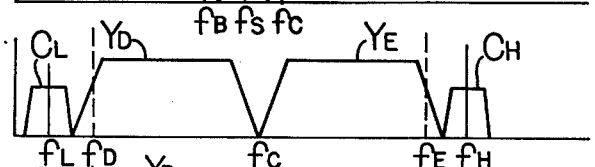
FIG. 8D
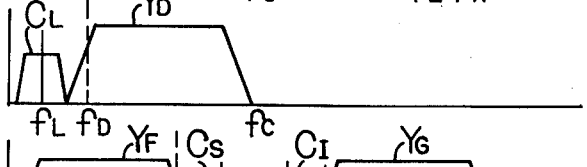
FIG. 8E
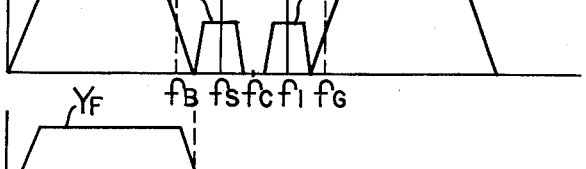
FIG. 8F
FIG. 8G
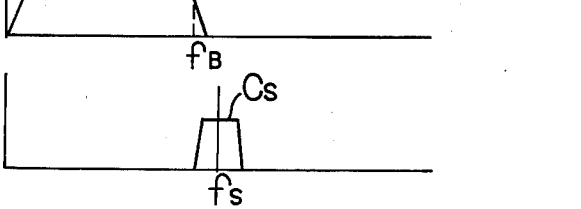
FIG. 8H

SYSTEM FOR REPRODUCING A VIDEO SIGNAL

BACKGROUND OF THE INVENTION

1. Field of the Invention

This invention relates to a system for reproducing information signals, such as video signals, to obtain an improved signal-to-noise ratio when such signals are reproduced from a magnetic recording medium.

2. The Prior Art

In recording television signals on a magnetic medium, it has been a common practice heretofore to modulate the frequency of a relatively high frequency carrier by means of the luminance signal of the composite television signal and then to record the resulting frequency-modulated signal on the magnetic medium. The signal-to-noise (S/N) ratio of the reproduced signal can then be quite high.

However, frequency modulation requires a relatively wide frequency deviation in order to obtain the best S/N characteristics. In the case of a frequency-modulated signal recorded on magnetic tape, this leads to the further requirement that the bandwidth of the information signal be limited or that a large quantity of the magnetic medium, such as magnetic tape, discs, or sheets, be used. In recording video signals on magnetic tape, it is customary to use a drum with a rotary magnetic head and to wrap the tape at least part way around the drum. If a wide band signal is to be recorded, the relative rotation of the rotary magnetic head with respect to the tape must be increased, and accordingly, a large head drum has been required for wide band recording.

A further disadvantage of the use of frequency modulation is that such signals produce a number of harmonics which require a circuit to filter them out.

A still further difficulty that arises when a video signal is magnetically recorded by prior apparatus is that the signal is commonly recorded in a series of adjacent tracks spaced apart from each other to provide an area referred to as a guard band between them. Such guard bands use up additional recording medium, and a number of techniques have been developed to minimize the width of guard bands. However, it has been difficult to eliminate beat signals generated between adjacent tracks when the guard bands are made too narrow or are entirely eliminated.

SUMMARY OF THE INVENTION

A system is provided for recording a video signal by producing a signal in which the video information is carried primarily on only one sideband and with the carrier at a relatively low frequency within the normal video band prior to modulation. The carrier may originally have a frequency above the band of the video signal modulated on it and may be frequency-converted to shift the carrier to the relatively low frequency. This requires that at least substantially all of one sideband be removed. In the case of a color television signal, the chrominance signal is frequency converted to occupy a still lower frequency band than the converted luminance signal.

In the following description the term "carrier frequency" will be used to designate the frequency that the carrier would occupy, although in some modulation techniques, the carrier may be completely suppressed.

An advantage of the recording system of the present invention is that penetration and spacing losses due to the gap between the recording head and the recording medium can be reduced. Furthermore, when the signal is reproduced, the influence of the head losses that result in a response characteristic that has frequencies at which the amplitude of the output signal reduces to zero due to the head gap occur in the higher frequency range of the recorded signal and can be greatly reduced. In addition the influence of self-demagnetization of a recorded signal and the influence of its recording demagnetization and the like can also be made extremely small. Consequently a signal having an excellent signal-to-noise ratio can be obtained when signals are recorded and reproduced in accordance with the present invention.

The losses just referred to occur because of the recording and reproducing characteristics of magnetic tape and the transducers. These characteristics are represented as a variation of amplitude with respect to frequency and exhibit a peak at a relatively low frequency, such as a frequency of about 1MHz, at which the overall recording and reproducing efficiency is relatively high. With the system of the present invention however, the carrier frequency of the signal to be recorded is made low so that it can be located close to the peak region of the characteristic response curve, thus improving the signal-to-noise ratio in the reproduced signal.

The system of the present invention permits signals to be sequentially recorded in adjacent tracks formed without guard bands between them and in fact in partially overlapping relationship. In spite of this relationship, when signals are reproduced from such overlapping tracks, the fidelity of the reproduced signals can be quite high. That is, with a reproducing system according to the present invention, if amplitude modulation or phase modulation is carried out in making the recording, and if the phases of the carrier signal at the respective recorded tracks are correlated at each position along the tracks, reproduced signals having high fidelity can be obtained. Because of the features of this system, even though time deviation of the carrier signals may occur between adjacent tracks during the recording process, the phase deviation is small because of the low carrier frequency. As a result, there is little influence due to beat interference of reproduced signals caused by cross-talk between adjacent tracks, and thus fidelity of the reproduced signals is not deteriorated.

This is to be contrasted with the fact that when a signal is frequency-modulated, carrier alignment is difficult to obtain between adjacent tracks, so guard bands are necessary. Since the recording can be carried out using amplitude modulation or phase modulation in accordance with the present invention in tracks that have no guard bands between them, the recording has a high density so that tape consumption is reduced and the tape speed can be made slower than has been the practice heretofore. However, even frequency modulation followed by filtering to remove most of one sideband and then frequency-converted to place the carrier at a low frequency still has the advantage of lower head losses, according to this invention.

Since the video signal in the present invention is preferably used to modulate the amplitude or phase of a carrier, the frequency range of the resulting modulated signal can be kept relatively narrow, and the speed of the rotary heads with respect to the magnetic tape can be made slow. As a result, the diameter of the head drum on which the rotary heads are mounted can be reduced.

Accordingly, it is a principal object of the present invention to provide a video signal magnetic reproducing system that has an improved signal-to-noise ratio in the reproduced signal.

Another object of this invention is to provide a video signal magnetic reproducing system in which jitter components are substantially removed even though the speed of the magnetic medium driving means fluctuates.

A further object is to provide a video signal reproducing system wherein a modulated luminance signal is synchronously detected by a stabilized reference signal.

Further objects and advantages of the present invention will be apparent from the following description taken in conjunction with the accompanying drawings.

BRIEF DESCRIPTION OF THE DRAWINGS

FIGS. 1A and 1B are graphs showing output characteristics of a normal magnetic recorder used for explaining the present invention.

FIG. 2 is a view showing recorded signals used for explaining the present invention.

FIGS. 5A to 5G are a series of waveform diagrams used for explaining the present invention.

FIG. 6 is a block diagram showing one example of a reproducing system corresponding to the system of FIG. 3.

FIG. 7 is a block diagram showing another example of the recording system.

FIGS. 8A to 8H show a series of frequency spectra for explaining the operation of the system in FIG. 7.

DETAILED DESCRIPTION OF THE INVENTION

Figure 3:
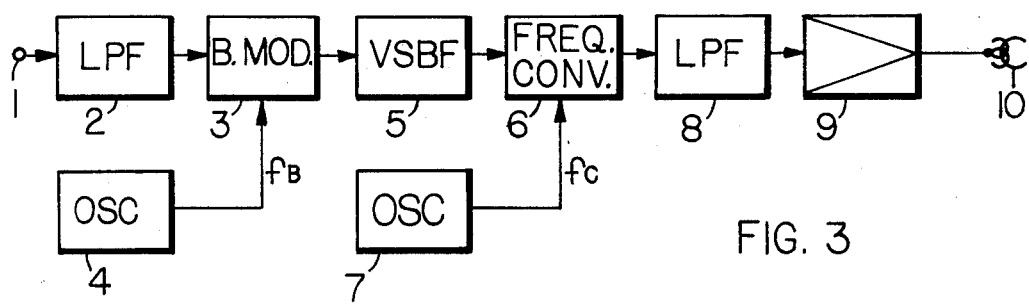
FIG. 3 is a block diagram showing one example of a signal recording system.

Before describing embodiments of the invention, the graphs in FIGS. 1A and 1B will first be examined to show the aspects of magnetic recording and reproduction that make the present invention so useful.

FIG. 1A is a graph in the form a frequency-response curve that illustrates recording head losses. The abscissa represents the frequency of a recording signal or the ratio of tape speed to wavelength, and the ordinate represents, on a logarithmic scale, the amplitude of the output voltage of the reproducer. It is well known that, in a relatively low frequency range, the amplitude of reproduced voltage from a playback transducer increases linearly with respect to frequency at a rate of 6dB per octave. However, as the frequency continues to increase, the recording flux is no longer linearly proportional to the recording current. There is some power dissipation in the recording head winding due to core and copper losses, and the response curve $a$ drops off to zero at a point P. Thus, it may be seen that a frequency range exists which is not entirely usable for video recording.

FIG. 1B is a graph of playback voltage with respect to frequency. The abscissa again indicates the frequency of the recorded signal and the ordinate indicates playback output voltage amplitude on a logarithmic scale. The playback voltage curve should ideally be a straight line $b$, but it departs from the straight line $b$ to follow the curve $c$ in a frequency band of approximately 1MHz and higher due to such factors as head losses, penetration and spacing losses, gap effect, recording demagnetization and self-demagnetization, and the like. These losses may occur during magnetic recording or thereafter.

It is apparent from an examination of the curves in FIGS. 1A and 1B that since the overall frequency response reaches a peak value at a frequency of around 1MHz, it would be preferable to record the signals in which a way that the carrier modulated by the video signal would be around 1MHz. Normally a carrier must be modulated by a signal having a much lower frequency than the carrier frequency, and so it would not be possible to modulate directly a 1MHz carrier by a video signal containing components even higher than 1MHz.

FIG. 2 shows a short length of magnetic tape M with several tracks $T_1$-$T_6$, of video signals recorded thereon. These tracks appear to be slightly skewed, but in actual practice they may be skewed to a much greater extent to be more nearly parallel to the longitudinal direction of the tape, which would be horizontal in FIG. 2. Tracks $T_1$-$T_3$ illustrate, in a simplified manner, a frequency relationship that may exist if signals having the same carrier frequency are recorded in each of the tracks and the carrier frequency, represented by the waveform $d$, is relatively low. The waves in tracks $T_1$ and $T_2$ are in phase with each other but there is a difference in phase between the waves in tracks $T_2$ and $T_3$. However, due to the fact that the carrier frequency is low, the phase shift with respect to one period of a carrier signal is small, so that even if a reproducing head $h$ that should be following the track $T_2$ partially extends over the track $T_3$, beat interference or cross-talk between adjacent tracks will not occur. The low frequency of the carrier makes it easy to align the carrier between adjacent tracks, even where there is a jitter phenomenon present.

In tracks $T_4$-$T_6$, the carrier signal $d'$ has a much higher frequency, typical of the prior art systems. As a result, jitter and the like, provide much higher phase changes, so that an amplitude-modulated or phase-modulated high frequency carrier could not easily obtain the phase control necessary to allow close spacing of adjacent tracks. In that case, if the reproducing head $h'$ partially overlaps a second track, as illustrated, a beat interference signal, or cross-talk signal, may appear. Since, in accordance with the present invention, the carrier frequency is approximately 1MHz, carrier alignment is much easier than has been possible heretofore with frequency-modulated carriers of much higher frequency. The allowance that must be made for jitter may be relatively large, and a servo circuit to eliminate jitter can be easily provided.

When a carrier signal is balanced-modulated (carrier suppressed amplitude modulation), with the modulation degree greater than that of normal amplitude modulation, the carrier signal may be considered to be an imaginary carrier signal. That is, the above-described carrier alignment in the balanced modulator is equivalent to alignment of sideband components having frequencies near the imaginary carrier frequency. In other words, since a normal television signal contains relatively many components around 1MHz, signal components in the vicinity of the above frequency range are used to be aligned.

FIG. 3 shows one example of a system for recording a black and white video signal. The video signal is applied to an input terminal 1 which is connected through a low pass filter 2 to a balanced modulator 3. An oscillator 4 that serves as a carrier source of a signal having a frequency $f_B$ is also connected to the modulator 3. The output of the balanced modulator is connected through a vestigial sideband filter 5 to a frequency converter 6. An oscillator 7 having a signal with a frequency $f_C$ is also connected to the frequency converter 6 and the converted output signal passes through a low pass filter 8 to an amplifier 9. The output of the amplifier 9 is connected to a recording head 10.

Figure 4A:
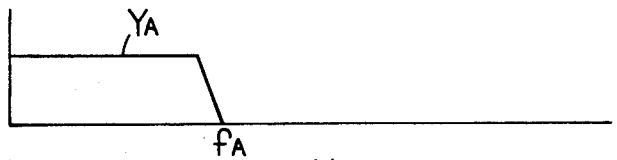
FIGS. 4A to 4G show a series of frequency spectra used for explaining the operation of the system in FIG. 3.

The operation of the circuit in FIG. 3 will be described in connection with frequency spectra in FIG. 4 and waveforms in FIG. 5. The signal at the output of the low pass filter 2 in FIG. 3 is identified as the signal $Y_A$ that has a frequency spectrum shown in FIG. 4A and a waveform shown in FIG. 5A. The upper limit of the frequency of the signal $Y_A$ is shown in FIG. 4A as frequency $f_A$ and is approximately 3.5MHz. This is the signal that is applied to the balanced modulator 3.

Figure 4B:
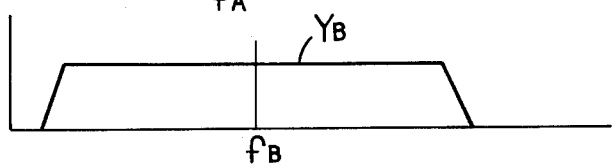

The carrier applied to the modulator 3 has a frequency $f_B$ equal to 4MHz, and the spectrum that results from the balanced modulation in the modulator 3 is illustrated in FIG. 4B by the signal $Y_B$. The waveform of this signal is shown in FIG. 5B where it may be seen that the modulated signal $Y_B$ has a portion $M_H$ that corresponds to the synchronizing signal $S_H$ in the signal $Y_A$ of FIG. 5. The portion $M_H$ has a greater amplitude than any other portion of the signal $Y_B$.

Figure 4C:
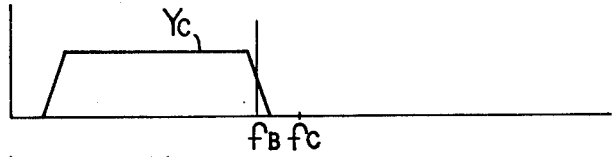
Figure 4D:
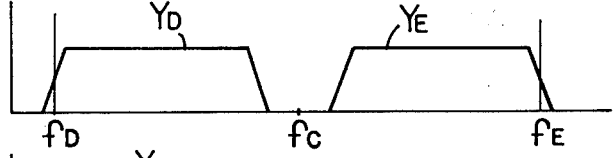
Figure 4E:
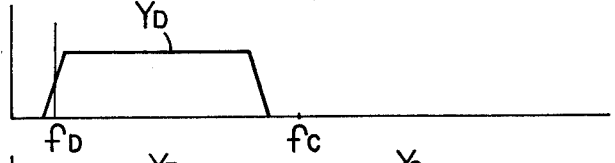

The modulated video signal $Y_B$ from the modulator 3 in FIG. 3 is applied to the vestigial sideband filter (hereinafter referred to as a VSBF) 5 that has a frequency response characteristic such that the amplitude of the signal is reduced 6dB at the carrier frequency $f_B$ so that most of the upper sideband component is eliminated and primarily only the lower sideband component $Y_C$ shown in FIG. 4C remains. This lower sideband component $Y_C$ is applied to the frequency converter 6 along with the signal $f_C$ from the oscillator 7. The signal $f_C$ has a frequency of about 5MHz so that the output signal of the converter 6 occupies two bands, as shown in FIG. 4D. One is represented by the signal $Y_D$ and the other by the signal $Y_E$. Although the frequency band of the signal $Y_D$ is below that of the signal $Y_E$, its carrier frequency is at its lower end at the frequency $f_D$, which is given by $f_D = f_C - f_B = $ 1MHz. Since it is typical of upper sideband signals to have the carrier near or below the lower end of their band, the signal $Y_D$ is referred to as an upper sideband signal. On the other hand, the carrier frequency $f_E$ of the signal $Y_E$ is determined by: $f_E = f_C + f_B = $ 9MHz. It is the upper sideband signal $Y_D$ that is desired, and so the signal from the frequency converter 2 is transmitted through the low pass filter 8 that passes only the frequencies occupied by the signal $Y_D$ and eliminates the signal $Y_E$. The spectrum of the output signal of the filter 8 is shown in FIG. 4E. This modulated video signal $Y_D$ is amplified by the recording amplifier 9 and applied to the magnetic recording head 10 to be recorded on a suitable magnetic medium.

FIG. 6 is a block diagram of a system for reproducing signals recorded by the system in FIG. 3, and it includes a pick-up head, or playback transducer, 11 connected to an amplifier 12 that supplies an amplified signal to a frequency converter 13. A variable frequency oscillator (VFO) 14 and a fixed frequency oscillator 15 supply signals to another frequency converter 16. The output signal of the converter 16 is applied to two filters 17 and 18. The output of the filter 18 is connected to the frequency converter 13. The output of the frequency converter 13 is connected through a low pass filter 19 to a synchronous detector 20 that also receives a signal from the filter 17. The output of the detector 20 is connected to a terminal 21.

The output signal of the low pass filter 19 is also connected to a gate circuit 22 and to an envelope detector 23. The output of the latter is connected to a synchronizing signal separator, or sync separator, circuit 24 that supplies signals to the gate circuit 22. The gated signals from the circuit 22 are applied to a phase comparator 25 that also receives signals from the filter 17 and supplies an output signal to control the operation of the VFO 14.

The operation of the system shown in FIG. 6 will be described in conjunction with the frequency spectra in FIG. 4 and the waveform diagrams in FIG. 5.

Figure 4F:
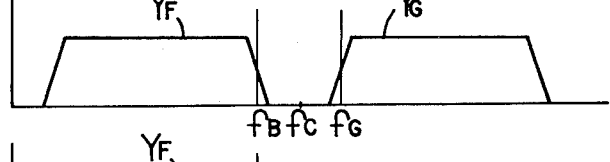
Figure 4G:
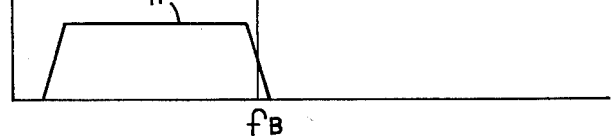

The magnetic head 11 reproduces the signal $Y_D$ shown in FIG. 4E, and this signal is amplified by the amplifier 12 and applied to the frequency converter 13. A signal having a frequency of about 0.5MHz is produced by the VFO 14 and another signal having a frequency of 4.5MHz is produced by the oscillator 15. When both of the latter signals are applied to the frequency converter 16, an output signal is produced that has both a sum component and a difference component. The difference component having a frequency $f_B$ of 4MHz passes through the filter 17 and the sum component that has a frequency $f_C$ of 5MHz passes through the filter 18 to be applied to the frequency converter 13. As a result, the converter 13 produces an output signal that occupies two bands as illustrated in FIG. 4F. The lower sideband component is identified by the reference symbol $Y_F$, and it has an imaginary carrier frequency $f_B$ determined by the equation $f_B = f_C - f_D = $ 4MHz. The upper sideband signal $Y_G$ has an imaginary carrier frequency $f_G$ determined by the equation $f_G = f_C + f_D = $ 6MHz. Only the lower sideband signal $Y_F$ is desired and so the output signal of the frequency converter 13 is passed through the low pass filter 19 to yield the signal $Y_F$ shown in FIG. 4G. This is the same as the signal $Y_C$ derived from the VSBF 5 in the recording system shown in FIG. 3. In order to demodulate the signal $Y_F$, it is applied to the synchronous detector 20 along with the difference frequency signal that has a frequency of 4MHz. The resulting detected signal is obtained at the output terminal 21 and is substantially the same as the signal $Y_A$ in FIG. 4A.

The modulated video signal $Y_F$ at the output of the filter 19 has a waveform as shown in FIG. 5B with a portion $M_H$ corresponding to the synchronizing signal. This portion has an amplitude larger than that of any other portion in the same way that the modulated video signal $Y_B$ obtained from the balanced modulator 3 in FIG. 3. The modulated video signal $Y_F$ at the output of the filter 19 is gated in the synchronous gate circuit 22 by a gate signal derived from the envelope detector 23 and the sync separator 24. The gate signal at the output of the sync separator 24 is the signal $P_H$ shown in FIG. 5D, and the gated signal at the output of the gate circuit 22, which corresponds to the signal portion $M_H$ having a frequency $f_B = 4$MHz is shown in FIG. 5C. This signal portion $M_H$ is applied to the phase comparator 25 to be compared with the signal that also has a frequency of 4MHz from the filter 17. Any difference between the phase of the signal $M_H$ and the phase of the signal from the filter 17 is applied as an error voltage to control the operation of the VFO 14 and thereby control the output of the frequency converter 16. The output signal of the VFO 14 is illustrated as a continuous wave signal Q in FIG. 5E.

Since the oscillation frequency and phase of the VFO 14 are controlled, the output signal of the filter 18 is also controlled so as to achieve jitter compensation. At the same time, depending on whether the original video signal $Y_A$ shown in FIG. 5A is located above or below the line e, which is at an intermediate level between the white and black levels, and, hence, depending on whether the video signal $Y_A$ is located in an interval $T_A$ or in an interval $T_B$ (assuming that the video signal has a sawtooth waveform), the synchronized carrier signal for synchronous detection in the circuit 20 and derived from the filter 17 becomes synchronous in phase with the 4MHz signal portion $M_H$ that occurs during the synchronizing interval. This is true even though the balanced-modulated signal $Y_B$, and therefore, the modulated video signal $Y_F$ derived from the filter 19 are reversed in phase. Therefore, a predetermined video signal, which is the same as the signal $Y_A$ derived from the filter 2 in the recording system in FIG. 3, is obtained at the output terminal 21.

FIG. 7 is a block diagram of a system for magnetically recording color video signals. The composite video signals are applied to an input terminal 31 from which they pass through a low pass filter 32 to a balanced modulator 33. A VFO 34 and a relatively fixed frequency oscillator 35 are connected to supply signals to a frequency converter 36. Two band pass filters 37 and 38 are connected to the output of the frequency converter 36. The output of the filter 37 is connected as the carrier signal to the balanced modulator 33.

The output signal of the modulator 33 is applied to a VSBF 39 and the resulting vestigial-sideband signal is applied to a mixer 40. The input terminal 31 is also connected through a band pass filter 41 to the mixer 40.

The combined output signal of the mixer 40 is connected to another frequency converter 42 that also receives the output signal of the filter 38. The frequency converted signal from the circuit 42 is applied to a low pass filter 43 and the resulting filtered signal is amplified in an amplifier 44 and applied to a recording transducer 45.

The input terminal 31 is also connected to a sync separator 46, the output of which is connected to a phase comparator 47. The frequency of the output signal of the VFO 34 is divided in a frequency divider 48 and applied to the frequency comparator 47 to produce an output signal that is fed back to control the operation of the VFO 34.

The output of the band pass filter 41, in addition to being connected to the mixer 40, is also connected to a burst gate 49. The output of the sync separator 46 is applied to a waveforming circuit 50 that in turn supplies a signal to the burst gate 49. The output of the burst gate is applied to control the frequency of the oscillator 35.

The operation of the circuit in FIG. 7 will be described in connection with the frequency spectra shown in FIG. 8. The luminance portion of the color signal applied to the input terminal 31 is able to pass through the low pass filter 32 and emerges as the luminance signal $Y_A$ shown in FIG. 8A. Its frequency band extends from approximately 0 to a frequency $f_B$ of 2.99MHz. This signal is applied as the modulating signal to the balanced modulator 33.

The VFO 34 generates a signal having a frequency $f_L = (2n+1/2)f_H$ where $f_H$ is the horizontal line frequency of the video system and $n$ is a positive integer, for example, $n=37$. In that case $f_L = 75/2f_H = 0.59$MHz. The oscillator 35 generates a signal having a frequency $f_S = 3.58$MHz. When the signals $f_L$ and $f_S$ are applied to the frequency converter 36, an output signal is produced having one component at the difference frequency $f_B$ 32 $f_S - f_L = 2.99$MHz, and another component having the sum frequency $f_C = f_S + f_L = 4.17$MHz. The filter 37 passes the frequency $f_B = 2.99$MHz as the carrier signal to the modulator 33 to be balanced-modulated by the luminance signal $Y_A$. The resulting signal is the signal $Y_B$ shown in FIG. 8B. The signals $Y_A$ and $Y_B$ in FIGS. 8A and 8B have waveforms similar to those shown in FIGS. 5A and 5B. The modulated luminance signal $Y_B$ has a portion $M_H$ that corresponds to the synchronizing signal $S_H$ of the luminance signal $Y_A$, and thus has an amplitude greater than that of any other portion of the signal $Y_B$. After the modulated luminance signal $Y_B$, as illustrated in FIG. 8B, is passed through the VSBF 39 in FIG. 7, a lower sideband component signal $Y_C$ is obtained. The VSBF 39 has a frequency response such that the amplitude of the signal $Y_C$ at the frequency $f_B = 2.99$MHz is 6dB below the maximum level. The signal $Y_C$ is one of the signals applied to the mixer 40.

The band pass filter 41 passes only the chrominance portion of the composite signal applied to the input terminal 31. This chrominance signal $C_S$ illustrated in FIG. 8C has a carrier frequency $f_S = 3.58$MHz and is the other signal applied to the mixer 40 to mix with the modulated luminance signal $Y_C$. The resultant mixed, or composite, signal having components $Y_C$ and $C_S$ is applied to the frequency converter 42 to be frequency-converted by the signal from the filter 38. The latter signal has the sum frequency $f_C = 4.17$MHz. As a result, the output signal of the frequency converter 42, as in FIG. 8D, includes luminance components $Y_D$ and $Y_E$ symmetrically arranged with respect to the frequency $f_C$ and chrominance components $C_L$ and $C_H$ also symmetrically arranged with respect to the frequency $f_C$. The imaginary carrier of the component $Y_B$ has the frequency $f_D$ near the lower end of the band of the signal $Y_D$ and thus, as described previously, the signal $Y_D$ is considered to be an upper sideband signal. The frequency $f_D$ is given by the equation $f_D = f_C - f_B = (f_S + f_L) - (f_S - f_L) = 2f_L = 1.18$MHz. The signal $Y_E$, which must be considered a lower sideband signal, has a carrier frequency $f_E$ determined by the equation $f_E = f_C + f_B = 2f_S = 7.16$MHz.

The lower frequency chrominance signal $C_L$ has a carrier frequency $f_L$ given by the equation $f_L = f_C - f_S = 0.59$MHz, while the higher frequency chrominance signal $C_H$ has a carrier frequency $f_H$ given by the equation $f_H = f_C + f_S = 2f_S = f_L = 7.75$MHz. The entire signal represented in FIG. 8D is applied to the low pass filter 43 that passes only frequencies below the frequency $f_C$. The output signal of the filter 43 is shown in FIG. 8E as comprising the chrominance signal $C_L$ that has the carrier frequency $f_L = 0.59$MHz and the upper sideband component $Y_D$ of the modulated luminance that has the carrier frequency $f_D = 1.18$MHz. The output signal of the filter 43 is applied through the recording amplifier 44 to the magnetic transducer 45 to be recorded on a suitable magnetic medium.

The sync separator 46 also receives the input color video signal from the terminal 31. The separated sync signal is applied to the phase comparator 47 to be compared with the output of the frequency divider 48. The division ratio in this divider is the ratio between the frequency $f_L$ of the VFO 34 and the horizontal line frequency $f_H$. In this example it is 2/75, so that both input signals to the phase comparator 47 are at the line frequency $f_H$. An error in phase between these two signals produces an error signal to be applied to the VFO 34 to control its frequency.

The separated sync signal is also modified by the waveforming circuit 50 to form a suitable gating signal to gate the color bursts in the chrominance signal $C_S$ derived from the filter 41. These bursts are gated in the circuit 49 and are applied to control the frequency of the oscillator 35, which has the same frequency of 3.58MHz as the chrominance burst signal.

Figure 9:
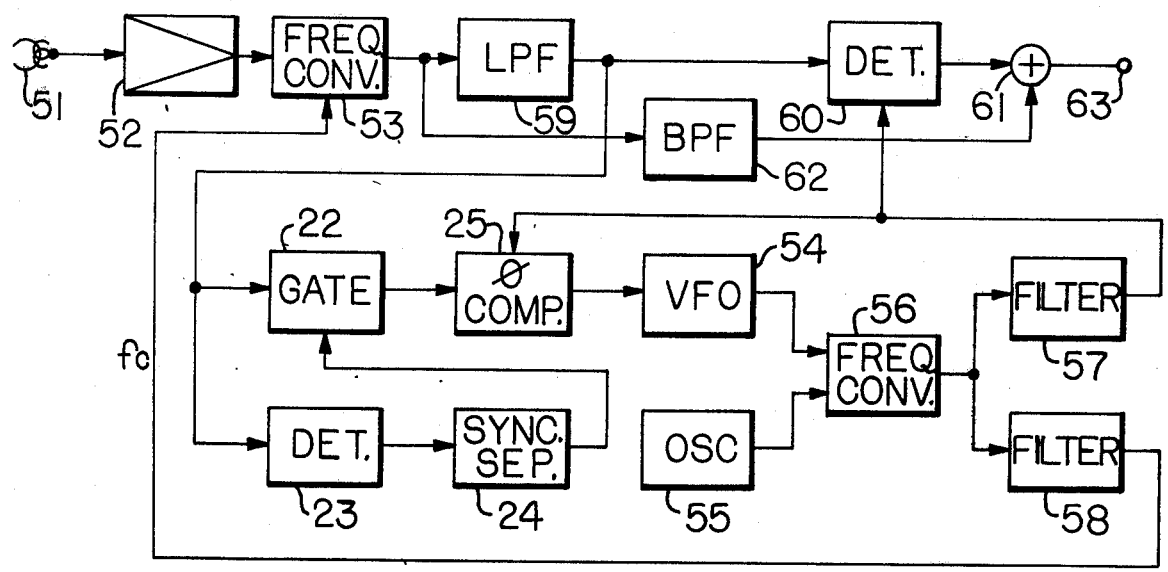
FIGS. 9-11 are block diagrams of other embodiments of reproducing systems.

FIG. 9 shows a suitable reproducing system to reproduce color television signals recorded in the system of FIG. 7. Some of the components in FIG. 9 are similar to those in FIG. 6 and have been given the same reference numerals. In FIG. 9 a reproducing transducer 51 is connected through an amplifier 52 to a frequency converter 53. A VFO 54 and an oscillator 55 are connected to supply signals to a frequency converter 56. The output of the frequency converter 56 is connected to the filters 57 and 58, the latter of which is connected to the frequency converter 53.

The output of the frequency converter 53 is connected through a low pass filter to a synchronous detector 60 that also receives the output signal of the filter 57. The output of the synchronous detector 60 is connected to a mixer 61 that also receives output signals from the frequency converter 53 by way of a bandpass filter 62. The output of the mixer 61 is connected to an output terminal 63.

The output of the low pass filter 59 is also connected to the gate circuit 22 and the envelope detector 23. The latter supplies signals to the sync separator 24 which is connected, in turn, to the gate signal input terminal of the gate circuit 22. The output of the gate circuit 22 is connected to the phase comparator 25 that also receives the output signal of the filter 57.

In describing the operation of the system in FIG. 9, reference will also be made to the frequency spectra illustrated in FIG. 8. The reproduced signal at the output of the amplifier 52 includes the luminance signal $Y_D$ and the chrominance signal $C_L$ as shown in FIG. 8E. The signal $C_L$ has a carrier at the frequency $f_L = 0.59$MHz and the luminance signal $Y_D$ has a carrier frequency $f_D$ of 1.18MHz. Both of these signals are frequency converted simultaneously in the frequency converter 53. The converting signal is generated by combining the output signal of the VFO 54, which has a frequency $f_L = 0.59$MHz and the output signal of the oscillator 55, which has a frequency $f_S = 3.58$MHz, in the frequency converter 56. The latter produces an output signal having one component with a frequency $f_B = f_S - f_L = 2.99$MHz, which is the difference frequency, and another component with the sum frequency $f_C = f_S + f_L = 4.17$MHz. The latter component passes through the filter 58 and is applied to the frequency converter 53 to convert the frequency of the signals $C_L$ and $Y_D$.

The resulting output signal of the frequency converter 53 is illustrated in FIG. 8F and includes a signal at the frequency $f_C$ of 4.17MHz with converted chrominance signals and luminance signals symmetrically spaced above and below that frequency. The chrominance signals are $C_S$ and $C_I$ having respective carrier frequency $f_S = f_C - f_L = 3.58$MHz and $f_I = f_C + f_L = 4.76$MHz. The luminance signals are still in modulated form and are the signal $Y_F$ having a carrier frequency $f_B$ of 2.99MHz and the signal $Y_G$ having the imaginary carrier frequency $f_G = f_C + f_D = 5.35$MHz. The low pass filter 59 permits only the signal $Y_F$ to pass to the synchronous detector 60. This signal is shown by itself in FIG. 8G. The bandpass filter 62 permits only the chrominance signal $C_S$ in the original chrominance frequency band with the original chrominance frequency $f_S = 3.58$MHz to pass through. This signal requires no further demodulation and is therefore applied directly to the mixer 61.

The luminance signal $Y_F$ must be detected in the synchronous detector 60 and for this purpose the difference frequency $f_B = f_S - f_L = 2.99$MHz from the frequency converter 56 is allowed to pass through the filter 57 to the detector 60. The detected luminance signal is then applied to the mixer 61 to be combined with the chrominance signal to reconstitute a composite color video signal at the output terminal 63.

The circuits 22 to 25 operate in the same manner as in FIG. 6 to control the operation of the VFO 54.

In accordance with this invention, when the composite signal consisting of the upper sideband of the modulated luminance signal $Y_D$ that has a relatively low suppressed carrier frequency and the chrominance signal $C_L$ having a frequency lower than the suppressed carrier frequency are reproduced from the recording medium, these signals are then frequency-converted. The frequency-converted luminance signal is synchronously detected, and the frequency-converting and synchronous-detecting signals are controlled by the same signal derived from the reproduced signal.

The frequency and phase of the signal from the VFO 54 in FIG. 9 are controlled, and as a result, the frequency-converting signal from the filter 58 is controlled to eliminate the jitter of the chrominance signal and to reduce the jitter of the modulated luminance signal. Further, the frequency and phase of the synchronous-detection signal from the filter 57 are controlled at the same time to eliminate the residual jitter of the modulated luminance signal.

Figure 16A:
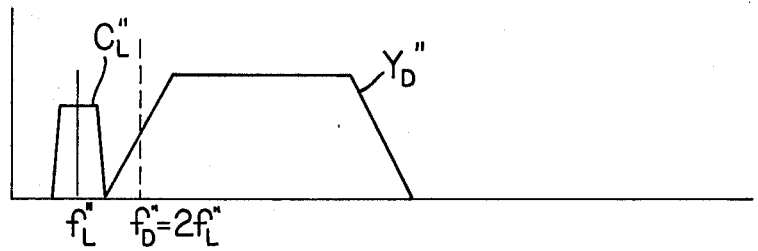
FIGS. 16A to 16E show a series of frequency spectra for explaining the reduction of jitter interference in the system of FIG. 7.
Figure 16B:
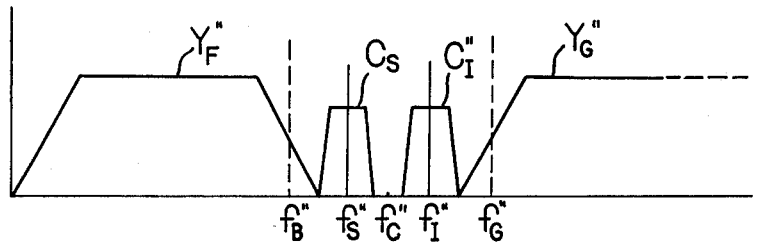
Figure 16C:
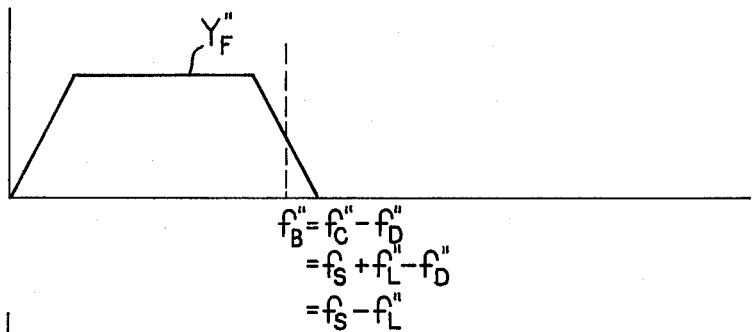
Figure 16D:
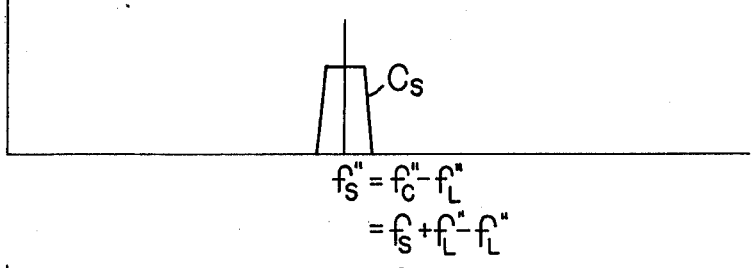
Figure 16E:
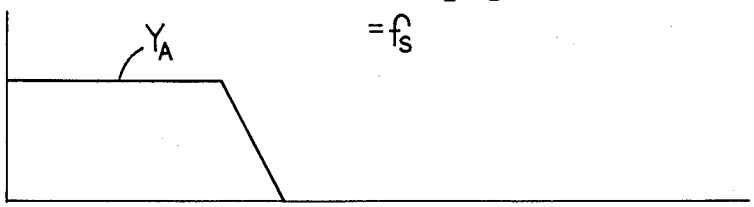

The operation of the circuit in FIG. 9 in minimizing the effect of jitter signals will be described in connection with FIGS. 16A to 16E. Let it be assumed that the recording has been performed in the recording system of FIG. 7 with the relation between the carrier frequencies $f_L$ and $f_D$ being such that $f_L = \frac{1}{2}f_D$. The frequency-converted chrominance signal $C_L$ and the modulated luminance signal $Y_D$ shown in FIG. 8E are recorded on magnetic medium and contain jitter components due to the fluctuation of the driving motor (not shown) during signal reproduction. The signal reproducing head 51 reproduces a chrominance signal $C_L''$ having a carrier frequency $f_L''$ and an upper sideband component signal $Y_D''$ having a suppressed carrier at a frequency $f_D''$, as depicted in FIG. 16A. The superscript double prime indicates that the signals so designated include jitter components. The chrominance signal $C_L''$ and the modulated luminance signal $Y_D''$ both containing jitter components are applied through the reproducing amplifier 52 to the frequency converter 53. Meanwhile, the signal having the frequency $f_L''$ containing jitter from the VFO 54 and the jitter-free signal having the frequency $f_S$ from the oscillator 55 are delivered to the frequency converter 56 to produce a signal of frequency $f_B'' = f_S - f_L''$ and a signal of frequency $f_C'' = f_S + f_L''$. The filter 57 passes the signal of frequency $f_C''$. This signal of frequency $f_C''$ from the filter 58 is fed to the frequency converter 53 to frequency-convert the reproduced signals $Y_D''$ and $C_L''$ to derive therefrom a luminance signal consisting of a lower sideband component signal $Y_F''$ having a suppressed carrier frequency $f_B'' = f_C'' - f_D'' = (f_S + f_L'') - f_D'' = f_S - f_L''$ and an upper sideband component signal $Y_G''$ having a suppressed carrier frequency $f_G'' = f_C'' + f_D'' = (f_S + f_L'') + f_D'' = f_S + 3f_L''$ and also a chrominance signal consisting of a signal $C_S$ having a carrier frequency $f_S = f_C'' - f_L'' = (f_S + f_L'') - f_L'' = f_S$ and a signal $C_I''$ having a carrier frequency $f_I'' = f_C'' + f_L'' = (f_S + f_L'') + f_L'' = f_S + 2f_L''$, as shown in FIG. 16B. These signals $Y_F''$, $Y_G''$, $C_S$ and $C_I''$ are supplied to the low pass filter 59 to pass therethrough a modulated luminance signal $Y_F''$ having an imaginary frequency $f_B'' = f_S - f_L''$, as shown in FIG. 16C. This modulated luminance signal $Y_F''$ is applied to the synchronous detector 60 to be synchronously detected by the signal $f_B'' = f_S - f_L''$ from the filter 57 to produce the luminance signal $Y_A$. The jitter component has thus been eliminated, as shown in FIG. 16E. The amplitude of the jitter components contained in the modulated luminance signal $Y_D''$ is reduced by one-half by the frequency converter 53 and the filter 59 and is further reduced to zero by the synchronous detector 60. The signals $Y_F''$, $Y_G''$, $C_S$ and $C_I''$ from the frequency converter 53 are also applied to the band pass filter 62 to pass therethrough the chrominance signal $C_S$ having a carrier frequency $f_S$, which includes no jitter component, as shown in FIG. 16D.

Even though a color signal system is not considered as in the circuit of FIG. 4, a common signal produced by a phase locked loop (PLL) comprising the components 14-18 is adapted to be supplied to the frequency converter 13 and the synchronous detector 20 so that the jitter components in the modulated luminance signal $Y_D$, shown in FIG. 4E, can be similarly eliminated. The jitter components contained in the reproduced signal obtained in other illustrated embodiments can be similarly eliminated.

Figure 10:
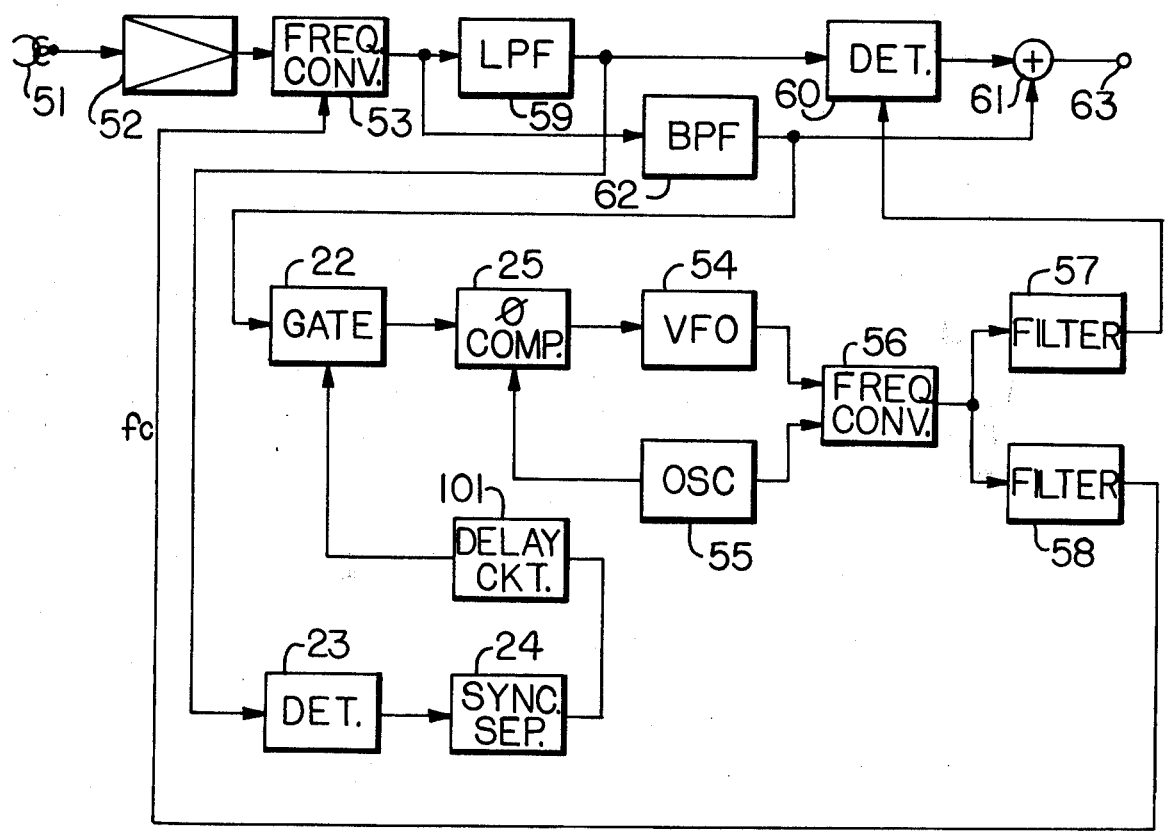

The embodiment in FIG. 10 is similar to that in FIG. 9 and includes a number of components that have corresponding interconnections and have therefore been given corresponding reference numerals. The only component in FIG. 10 not found in FIG. 9 is a delay circuit 101 connected between the output of the sync separator 24 and the gate signal input terminal of the gate circuit 22, but some of the other components are connected differently than in FIG. 9. In FIG. 10 the signal to be gated is obtained from the output of the bandpass filter $C_S$ rather than from the output of the low pass filter 59 as in FIG. 9. Furthermore, instead of connecting the output of the filter 57 to the phase comparator 25, an output from the oscillator 55 is connected to the phase comparator.

The operation of the circuit in FIG. 10 differs from that in FIG. 9 in that the frequency reconverted chrominance signal $C_S$ having the carrier frequency $f_S = 3.58$MHz from the output of the bandpass filter 62 is gated in the gate circuit 22. In order to obtain a gating signal at the proper time to gate the burst, the sync pulses from the sync separator 24 are delayed slightly in the delay circuit 101 to occur at the time of the bursts on the back porch of the blanking signal that forms part of the chrominance signal $C_S$. Thus the output of the gate circuit 22 consists of bursts of oscillations at the frequency $f_S = 3.58$MHz. These are compared in the phase comparator 25 with the 3.58MHz output signal of the oscillator 55, and any error creates a signal that is applied to control the operation of the VFO 54 and thus the operation of the frequency converter 56. It will be recalled that the sum signal having the frequency $f_C = f_S = f_L$ that passes through the filter 58 from the frequency converter 56 is the signal used in the frequency converter 53. Thus, controlling the operation of the VFO 54 by phase comparison of the reconverted burst signal with the output signal of the oscillator 55 controls the frequency conversion throughout the system.

Figure 11:
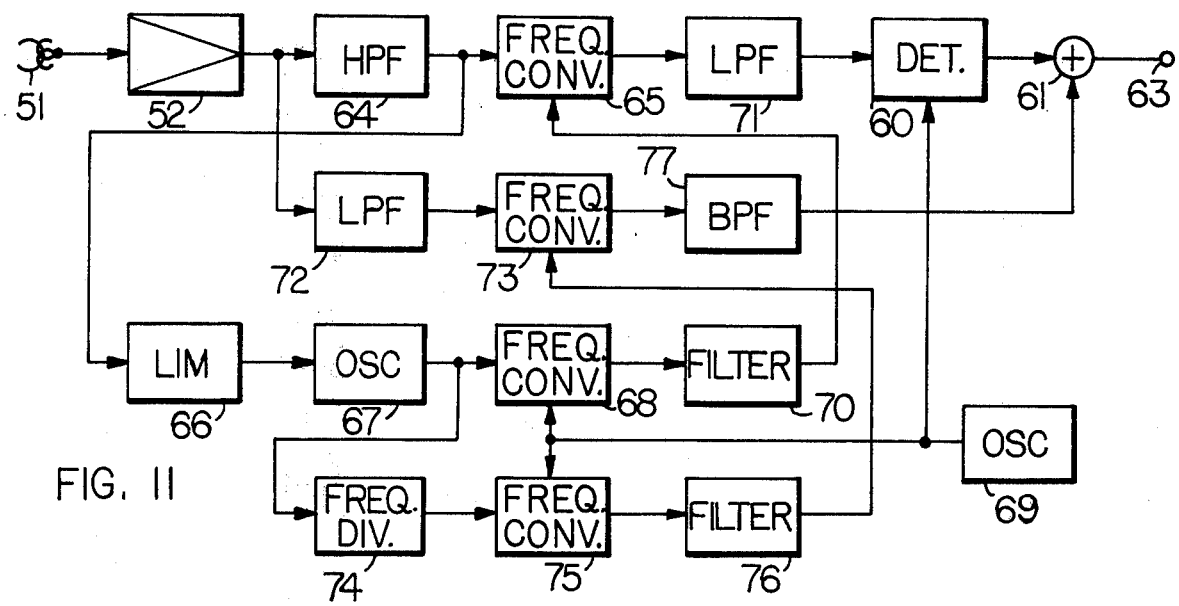

FIG. 11 is another example of the reproducing system. It includes a number of components discussed in connection with other embodiments. Those components have been given the same same reference numerals in FIG. 11 as they were given in other embodiments.

In FIG. 11 the transducer 51 is connected through the amplifier 52 to a high pass filter 64. The output of the filter 64 is connected to one of the input terminals of a frequency converter 65 and is also connected to a limiter circuit 66. The output of the limiter circuit is connected to an oscillator 67 that supplies its output signal to a frequency converter 68. An oscillator 69 is also connected to the frequency converter 68 and the output of the frequency converter 68 is connected through a filter 70 to a second input terminal of the frequency converter 65. The output of the frequency converter 65 is connected through a low pass filter 71 to the synchronous detector 60.

The output signal of the amplifier 52 is also connected through a low pass filter 72 to a frequency converter 73. A frequency divider 74 is connected to an output circuit of the oscillator 67 and in turn has its output circuit connected to a frequency converter 75. The latter receives the output signal from the oscillator 69 and the output signal of the frequency converter 75 is connected through a filter 76 to the frequency converter 73. The output of the frequency converter 73 passes through a bandpass filter 77 to the mixer circuit 61 which is also connected to the output of the synchronous detector 60. The output terminal 63 of the system is connected to the mixer circuit 61.

The operation of the system in FIG. 11 will be explained with the assistance of the graphs of frequency spectra in FIG. 12. In FIG. 11 the modulated luminance signal $Y_D$ and the chrominance signal $C_L$ shown in FIG. 12A and reproduced by the transducer 51 and the amplifier 52 correspond to the signals shown in FIG. 8E and are frequency converted by signals having different frequencies. The luminance signal $Y_D$ passes through the high pass filter 64 to be separated from the chrominance signal as illustrated in FIG. 12B. Since the location of the carrier frequency $f_D$ is near the lower edge of the band occupied by the signal $Y_D$, this signal is referred to as an upper sideband signal. As stated previously, the frequency $f_D$ is 1.18MHz.

The signal $Y_D$ is applied to the frequency converter 65 and in order to derive a converting signal, the signal $Y_D$ is also applied through the limiter 66 to synchronize the oscillator 67 that operates at the frequency of 1.18MHz. The signal from the oscillator is applied to the frequency converter 68 along with the signal from the oscillator 69. The latter signal operates at the chrominance sub-carrier frequency $f_S$, which is 3.58MHz, and the output signal of the frequency converter 68 includes a component $f_I$ where $f_I = f_D + f_S = 4.76$MHz. The output signal of the frequency converter 68 is filtered by the filter 70 to extract only the signal having the frequency $f_I$ to be applied to the frequency converter 65. As a result, the output signal of the frequency converter 65 includes a component $Y_C$ shown in FIG. 12C with the carrier frequency $f_S$ of 3.58MHz. This signal is passed through the filter 71 to remove any other components, and the signal $Y_C$ is applied to the synchronous detector 60 in order to demodulate it. Since the carrier frequency $f_S$ of the signal $Y_C$ is at 3.58MHz, the output signal of the oscillator 69 can be used directly in the synchronous detector 60 to demodulate the signal $Y_C$ and to recreate at the output of the detector 60 the signal $Y_A$ shown in FIG. 12D.

Figure 12A:
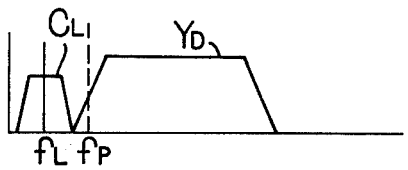
FIGS. 12A to 12G show a series of frequency spectra for explaining the system illustrated in FIG. 11.
Figure 12B:
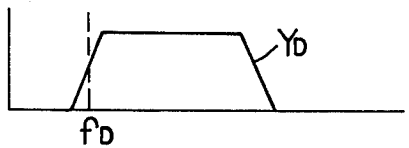
Figure 12C:
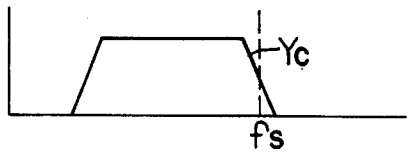
Figure 12D:
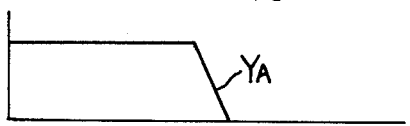
Figure 12E:
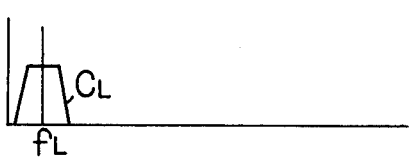
Figure 12F:
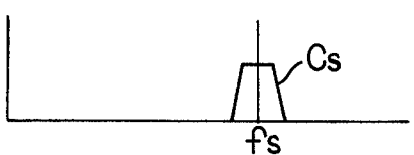
Figure 12G:
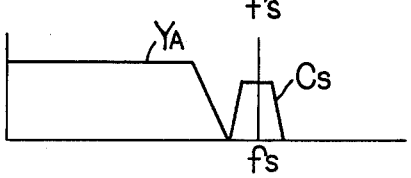

The combined signals $C_L$ and $Y_D$ shown in FIG. 12A are also applied to the low pass filter 12 which passes only the signal $C_L$ to the frequency converter 73. The signal $C_L$ has a carrier frequency $f_L$ of 0.59MHz and this frequency must be converted to 3.58MHz. In order to do this, the output signal of the oscillator 67 at a frequency of 1.18MHz is frequency-divided by 2 in the frequency divider 74 to a value of 0.59MHz. This signal is applied to the frequency converter 75 along with the signal from the oscillator 69 at the frequency $f_S$ of 3.58MHz. As a result, one of the output components of the frequency converter 75 has a frequency $f_C = f_L + f_S = 4.17$MHz. This component is able to pass through the filter 76 to the frequency converter 73 to convert the frequency of the signal $C_L$. The output signal of the frequency converter 73 includes the converted chrominance signal $C_S$ shown in FIG. 12F and having the proper sub-carrier frequency $f_S$ of 3.58MHz. This signal is able to pass through the bandpass filter 77 to the mixer circuit 61 to be combined there with the luminance signal $Y_A$ shown in FIG. 12D to form, at the output terminal 63, the combined signal shown in FIG. 12G.

In the embodiments described to this point, the black and white video signal or the luminance component of the color video signal has been balanced modulated. However, normal amplitude modulation may be used instead of balanced modulation. In that case, the carrier signal, which would be eliminated by balanced modulation, remains in the modulated signal. Furthermore, angular modulation, for example, phase modulation, may also be used. In this case it may also be possible for the phase modulation to have a signal that consists mainly of the lower side band component in which the carrier frequency is near the upper portion of the band occupied by the signal. This lower sideband component signal can then be frequency converted to produce a modulated signal consisting mainly of the upper sideband component with a low carrier frequency well within the band under the curve c in FIG. 1B.

Figure 13:
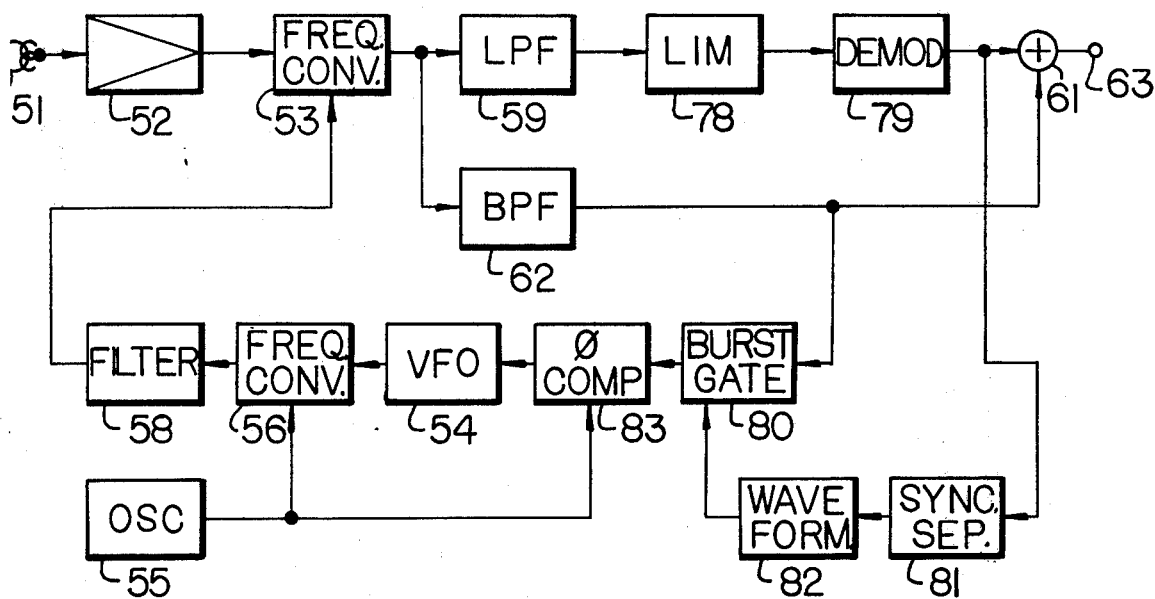
FIG. 13 is a block diagram of another embodiment of a reproducing system according to the invention.

FIG. 13 shows a reproducing system for reproducing a color video signal in which the luminance portion has been phase modulated and has a carrier frequency $f_D$ of 1.18MHz. The chrominance signal is in the low frequency region and corresponds to the signal $C_L$ in FIG. 12A, for example. It has a carrier frequency $f_L$ of 0.59MHz.

The circuit in FIG. 13 uses a number of components that have been described in previous embodiments and which will therefore be given the same reference numerals. The transducer 51 connected through the amplifier 52 to one input terminal of the frequency converter 53. The VFO 54 and the oscillator 55 connected to the frequency converter 56 produce a signal which, when filtered by the filter 58 and applied to the frequency converter 53, has the desired frequency to convert the incoming signal from the amplifier 52. The output signal of the frequency converter 53 is applied to the low pass filter 59 and, through the bandpass filter 62, to the mixer 61.

The filter 59 is connected through a limiter 78 to a phase demodulator 79 that has its output terminal connected to another input terminal of the mixer 61. The output of the filter 62, in addition to being connected to the mixer 61, is also connected to a burst gate 80. The output terminal of the phase demodulator 79 is connected to a sync separator 81 that is connected, in turn, to a waveforming circuit 82. The output of the waveforming circuit 82 is connected to the gating signal input terminal of the burst gate 80 and the output of the burst gate 80 is connected to a phase-comparator 83. The output of the oscillator 55 is also connected to the phase comparator 83 and the output of the phase comparator is connected to the VFO 54.

In the operation of the circuit in FIG. 13, both the phase-modulated luminance signal and the frequency-converted chrominance signal have their frequencies converted in the frequency converter 53. The VFO 54 has an output signal with a frequency $f_L$ of 0.59MHz, and this signal is combined, in the frequency converter 56, with the input signal of the oscillator 55 having a frequency $f_S = 3.58$MHz to produce an output signal $f_C$ which is the sum of the frequencies $f_L$ and $f_S$ and therefore has a frequency of 4.17MHz. This signal is passed through the filter 58 and applied to the frequency converter 53 where it converts the carrier frequency $f_D$ of 1.18MHz of the phase-modulated luminance signal to a frequency of 2.99MHz and converts the carrier frequency $f_L$ of 0.59MHz of the chrominance signal $C_L$ to a frequency $f_S$ of 3.58MHz. The chrominance signal $C_L$ is, itself, converted to the original chrominance band so that it is again the signal $C_S$. On the other hand the luminance signal is still a phase-modulated signal and must be demodulated. For this purpose, it is passed through the limiter 78 to the phase demodulator 79 from which it emerges as a demodulated luminance signal to be mixed in the mixer 61 with the reconverted chrominance signal so as to be available as a reconstituted color video signal at the output terminal 63.

The output signal of the phase demodulator 79 is a luminance signal that includes synchronizing pulses, and these are separated in the sync separator 71 and applied to the waveforming circuit 82, which essentially delays them and makes them suitable for gating burst signals from the chrominance signal $C_S$ at the output of the bandpass filter 62. The gated burst signals from the burst gate 80 are applied to the phase comparator 83 to be compared with the signals from the oscillator 55 to generate a signal that controls the operation of the VFO 54 to maintain its frequency correct to produce the proper frequency converting signal for the frequency converter 53.

Figure 14:
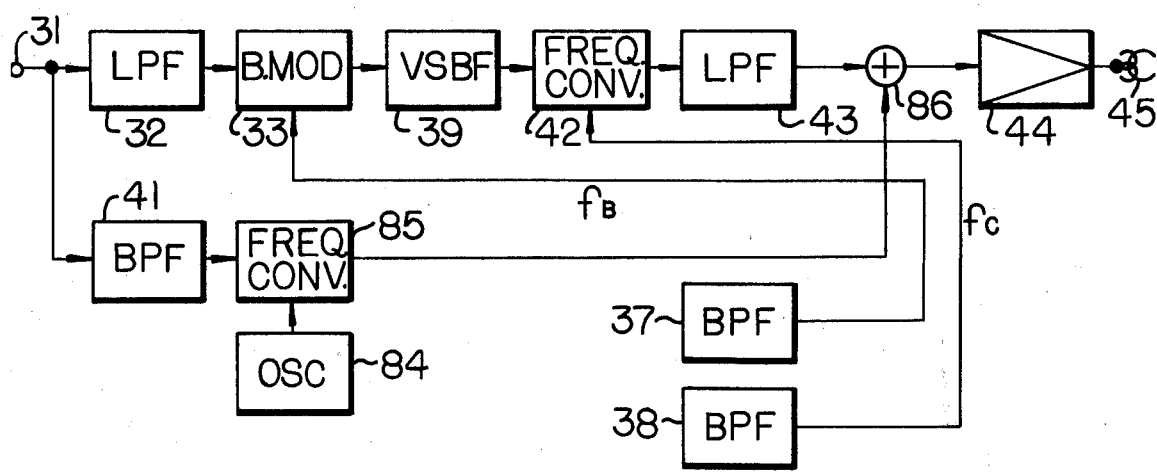
FIGS. 14 and 15 are block diagrams showing other examples of recording systems.

FIG. 14 shows a circuit that can be substituted for part of the circuit in FIG. 7. Those components in FIG. 14 that correspond to components in FIG. 7 have been given corresponding reference numerals.

In FIG. 7, when a composite color video signal is to be recorded, the lower sideband signal $Y_C$ derived from the VSBF 39 and the chrominance signal $C_S$ derived from the bandpass filter 41 are combined in the mixer 40 to produce the composite signal $Y_C + C_S$, which is then frequency converted in the common frequency converter 42. In the modification in FIG. 14, the chrominance signal $C_S$ and the modulated upper sideband signal $Y_D$ are separately frequency converted.

FIG. 14 includes the input terminal 31 connected to the low pass filter 32 and to the bandpass filter 41. The output of the low pass filter 32 is connected to the balanced modulator 33 along with a carrier signal obtained from the bandpass filter 37. Although not shown in FIG. 14, the bandpass filter 47 is connected to receive a signal from the frequency converter 36 shown in FIG. 7. The output of the modulator 33 is connected to the VSBF 39 which is connected directly to the frequency converter 42, contrary to the arrangement of the circuit in FIG. 7. The output of the frequency converter 42 is connected to the low pass filter 43.

An oscillator 84 is connected to supply a signal to a frequency converter 85 that also receives a signal from the bandpass filter 41. The resulting frequency converted signal is connected to a mixer circuit 86 that is also connected to receive the output signal of the low pass filter 43. The output of the mixer 86 is connected through the amplifier 44 to the transducer 45.

The chrominance signal $C_S$ derived from the bandpass filter 41 and fed to the frequency converter 85 has a carrier frequency $f_S = 3.58$MHz. The oscillator 84 has a frequency $f_C = 4.17$MHz and the difference signal $C_L$ at the output of the frequency converter 85 has a carrier frequency $f_L = 0.59$MHz. This signal may be filtered and applied to one of the input terminals of the mixer circuit 86.

The luminance signal from the low pass filter 32 is applied to the balanced modulator 33 along with a carrier signal from the bandpass filter 37. This carrier signal has a frequency $f_B = 2.99$MHz so that the output signal of the balanced modulator 33 is the signal $Y_B$ shown in FIG. 8B. The VSBF 39 eliminates most of the upper sideband of this signal leaving the vestigial sideband signal $Y_C$ shown in FIG. 8C. this signal is frequency converted in the frequency converter 42 by being combined with the signal from the band pass filter 38. The latter signal has a frequency $f_C = 4.17$MHz so that the lower sideband modulated luminance signal $Y_C$ becomes an upper sideband modulated luminance signal $Y_D$ with a carrier frequency of $f_D = 1.18$MHz. The signal is filtered in the low pass filter 43 and combined with the frequency converted chrominance signal $C_L$ in the mixer 86 to produce an output signal corresponding to that shown in FIG. 8E. This output signal is amplified by the amplifier 44 and applied to the transducer 45 to be recorded on a suitable recording medium.

Figure 15:
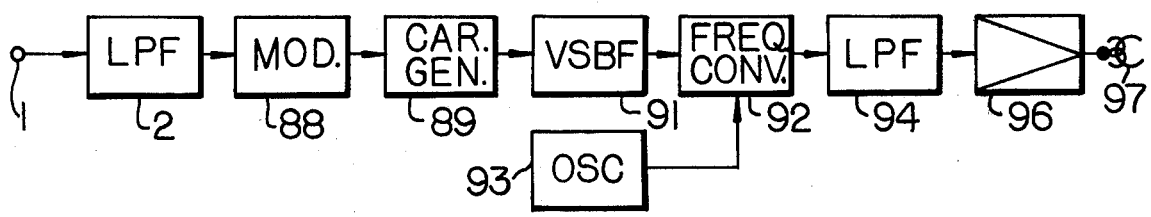

When a color video signal is recorded, the carrier frequency, instead of its amplitude or phase, may be modulated in accordance with this invention. FIG. 15 shows a circuit for obtaining frequency-modulated recording signals.

In FIG. 15, the video signals, or the luminance signals in the case of color video signals, are applied to the input terminal 1 and passed through the low pass filter 2. An angular modulator 88 is connected to the filter 2, and the output of the modulator is connected to a carrier generator 89. The output of the carrier generator 89 is connected through a VSBF 91 to a frequency converter 92. A source 93 of a converting signal is also connected to the frequency converter, and the output of the converter is connected through a low pass filter 94 and an amplifier 96 to a recording transducer 97.

In the operation of the circuit in FIG. 15, the frequency of the carrier produced in the generator 89 may be about 3.5 MHz modulated by the video signal to have a frequency deviation of about ± 0.5MHz. For example, the peak sync signal may deviate the frequency of a frquency $f_1$ of about 3.0MHz and the white peak signal to a frequency $f_2$ of about 4.0MHz. Only the modulated lower sideband signal under 4.0MHz is frequency converted in the converter 92 by a signal having a frequency $f_3$ of about 5.0MHz. The filter 94 transmits the sideband signal between the converted white peak frequency of $f_3 - f_2 = 1$MHz and the converted peak sync frequency of $f_3 - f_1 = 2$MHz to the amplifier 96. This amplifier applies the signal to the transducer 97 as a recording signal.

The chrominance signal can be separately converted to a lower frequency band so that it does not have to pass through the modulator 88 along with the luminance signal, in a manner similar to that illustrated in FIG. 5. The recorded frequency-modulated signal can be reproduced in a playback system similar to that in FIG. 13 if the demodulator 79 is a frequency demodulator.

Figure 17:
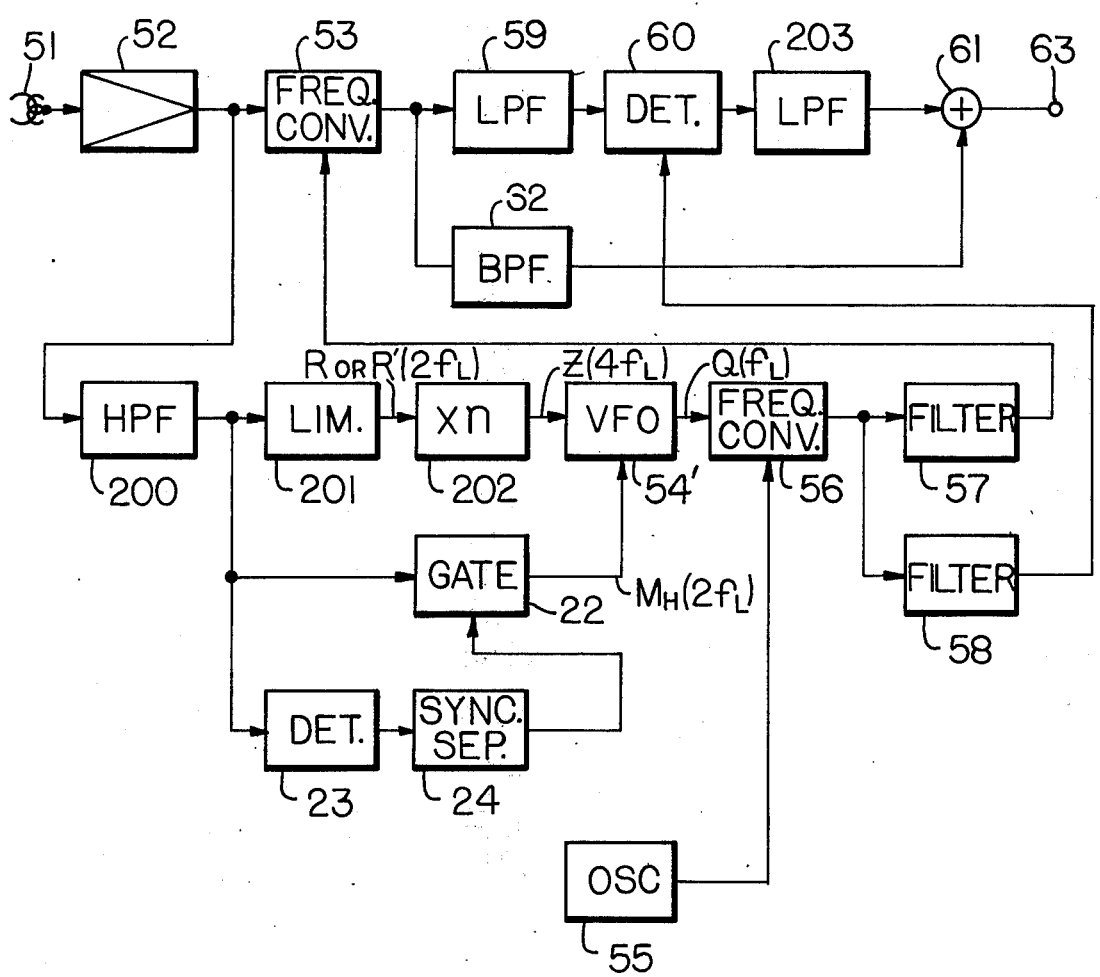
FIG. 17 is a block diagram of a reproducing system according to the present invention.

FIG. 17 shows an embodiment of a reproducing system according to this invention. Some of the components are fundamentally the same as in FIG. 9 and have been given corresponding reference numerals. The interconnections of these parts will not be described again. In FIG. 17, a high pass filter 200 connects the output of the amplifier 52 to the detector 23, gate 22 and a limiter 201. The output of the limiter is connected to a frequency multiplier, which, in turn, is connected to the VFO 54'. A low pass filter 203 connects the output of the synchronous detector 60 to one input of the mixer 61.

In the system in FIG. 9, the gate circuit 22 transmits the portion $M_H$ of the balanced-modulated signal $Y_F$ received from the filter 59. These signals are shown in FIGS. 5C and 5B. The gated signal $M_H$ is applied to the phase comparator 25 to be compared with the signal from the filter 57 to produce an error signal to control the phase and frequency of the output signal of the VFO 54. This is the signal Q shown in FIG. 5E. Such phase comparison is only carried out during each horizontal synchronizing interval. The phase and frequency of the signal Q in FIG. 5E may not remain constant during the entire interval between the pulses $P_H$ in FIG. 5D. In the system in FIG. 17, more stability is achieved because the output of frequency multiplier 202 is continuously applied to VFO 54'.

In describing the operation of the system in FIG. 17 it will be assumed that the signal reproduced by the transducer 51 includes a modulated luminance signal $Y_D$, which is modulated on a suppressed carrier having a frequency $f_D$, and a chrominance signal $C_L$ having a carrier frequency $f_L$ as shown in FIG. 8E, and that $f_D = 2f_L$. The signal $Y_D$ passes through the filter 200 to the limiter 201. The frequency of the output signal of the limiter is doubled in the frequency multiplier 202 to a frequency $2f_D = 4f_L = 2.36$MHz, and this signal is applied to one of the control input terminals of the VFO 54. The VFO 54' produces an output signal having a frequency $f_L$.

The signal $Y_D$ from the filter 200 is also applied to the gate circuit 22 and to the envelope detector 23. The latter detects the envelope of the signal $Y_F$ in FIG. 5B and produces an output pulse signal $P_H$ in response to the highest amplitude portions. Even with the signal folding that is typical of a balanced modulated signal, these portions occur during horizontal sync intervals. The pulses $P_H$ are separated out by the circuit 24 and applied to the gating signal input terminal of the gate circuit 22 to allow the signal portions $M_H$ shown in FIG. 5C to pass through. The frequency of oscillations during the portions $M_H$ is $f_D = 2f_L = 1.18$MHz, and this signal is also applied to the VFO 54' to control the phase of its output signal.

With this arrangement, even though the balanced-modulated signal $Y_B$ derived from the filter 59 reverses in phase when the modulating signal $Y_A$ in FIG. 5A crosses from one side of the line e to the other, the frequency multiplier 202 produces a signal having the frequency $4f_L = 2.36$MHz and a constant phase. The signal having the frequency $f_L = 0.59$MHz produced by the VFO 54' can be synchronized according to four different phase conditions by the signal having the frequency $4f_L$. However, the VFO 54' is also synchronized by the signal $2f_L = 1.18$MHz, which permits only two phase conditions. Accordingly, the synchronous detector 60 recreates the original luminance signal $Y_A$ even though the phase of the modulated luminance signal $Y_F$ derived from the filter is reversed, as described hereinabove.

Figure 18A:
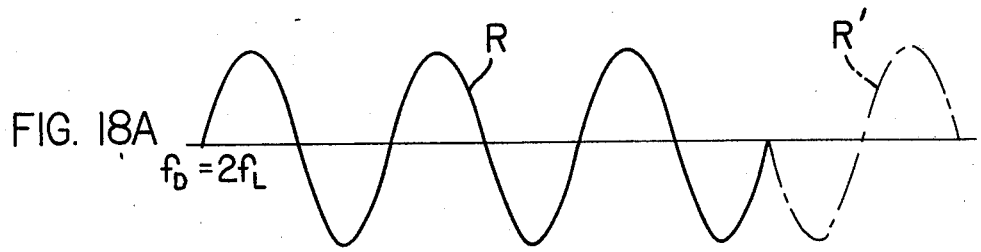
FIGS. 18A to 18D show waveforms used in describing the operation of the system in FIG. 17.
Figure 18B:
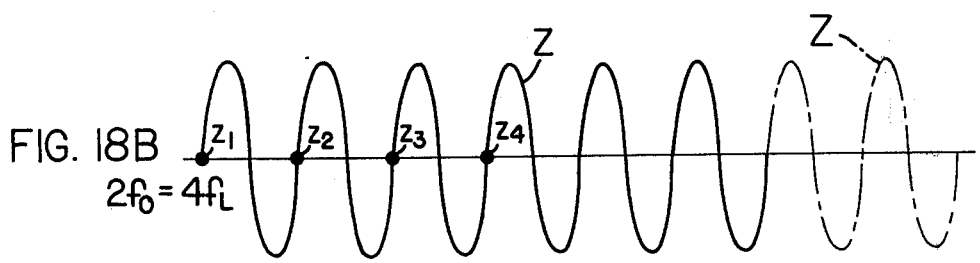
Figure 18C:
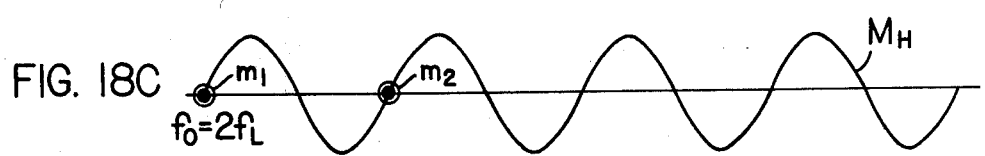

The operation of this portion of the system in FIG. 17 will be described with reference to the waveforms in FIGS. 18A to 18D. The output signal R or R' of the limiter 201 is illustrated on different time scales in FIG. 5F and FIG. 18A. This signal reverses phase each time the modulating signal $Y_A$ in FIG. 5A crosses the line e. When the signal R or R' is applied to the frequency multiplier 202, an output signal Z is produced that has the frequency $2f_D = 4f_L$, so the phase of this output signal is constant, as shown in FIGS. 5G and 18B and is independent of the phase of the output signal R or R' from the limiter 201.

Figure 18D:
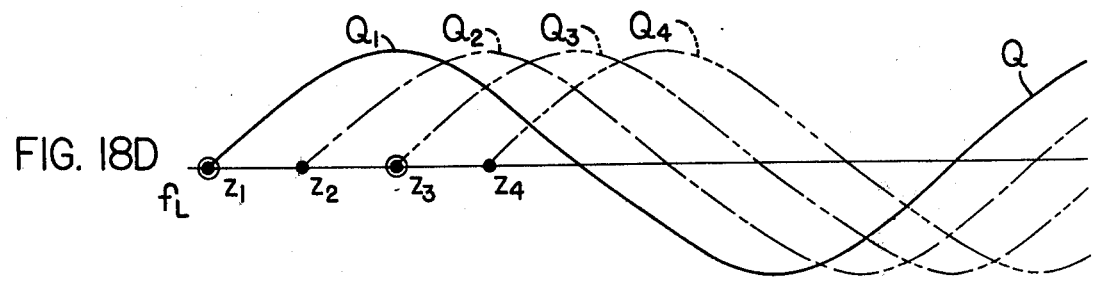

When the signal Z is applied to the VFO 54', the output signal Q of the VFO could be phase-locked at any of the four phase conditions $Z_1$, $Z_2$, $Z_3$, and $Z_4$ of the signal Z, as shown by the waves $Q_1$–$Q_4$ in FIG. 18D. However, the signal Q is also phase-locked with the two phase conditions $m_1$ and $m_2$ of the signal $M_H$ in FIGS. 5C and 18C. This signal from the gate 22 has the frequency $2f_L$, with the result that the signal Q can only be locked with one of the phase conditions $Z_1$ or $Z_3$.

Even if the modulated signal $Y_D$ is detected at the synchronous detector 60 by a signal obtained from one of the signals $Q_1$ or $Q_3$, a predetermined luminance signal can be produced. That is, if the reproduced modulated luminance signal $Y_D$ is defined as $E_Y\cos(2\omega_L + p)t$, the signal from the VFO 54' defined as $\cos(\omega_L t + \phi)$, and the signal from the oscillator 55 as $\cos\omega_S t$, the signal from the filter 57 is represented as $\cos[(\omega_S + \omega_L)t + \phi]$ and the signal from the filter 58 as $\cos[(\omega_S - \omega_L)t - \phi]$.

Accordingly, the modulated luminance signal $Y_F$, which is frequency-converted by the converter 53 and filtered through the filter 59, is expressed as $E_Y\cos[(\omega_S - \omega_L - p)t + \phi]$ and the luminance signal, which is detected by the synchronous detector 60 and filtered through the filter 203, will be expressed as $E_Y\cos(pt - 2\phi)$. Therefore if the phase $\phi$ of the signal $\cos(\omega_L t + \phi)$ from the VFO 54 is controlled to have a phase $\phi_o$ or the inverted phase $\phi_o + \pi$, the detected luminance signal $E_Y\cos(pt - 2\phi)$ from the filter 203 is expressed as $E_Y\cos(pt - 2\phi_o)$ or $E_Y\cos pt - 2(\phi_o + \pi) = E_Y\cos(pt - 2\phi_o)$, with the result that a predetermined luminance signal can be produced. As a result, a desired reproduced color video signal can be obtained at the output terminal 63.

When a color video signal is recorded, the carrier frequency of the modulated luminance signal as recorded on a recording medium may be selected to be several times as high as the chrominance carrier frequency that has been converted to a lower frequency band than the luminance signal. For example, when the chrominance signal has been converted so that its carrier is at the frequency $f_L = 0.59$MHz, the sub-carrier of the modulated luminance signal may be selected to be approximately 1MHz. Although in the foregoing description of embodiments of the present invention, the luminance carrier has been referred to as 1.18MHz, which is the second harmonic of the carrier frequency $f_L$ of the converted chrominance signal, it is not necessary that there be an integral multiple relationship between these two carrier frequencies. It is sufficient if the sub-carrier of the modulated luminance signal is in a low frequency range such that the spectrum of the modulated luminance signal and that of the chrominance signal converted to a still lower frequency band do not overlap each other. The specific frequencies referred to are especially suited for use where television signals are generated according to N.T.S.C. standards, but other frequencies can be used even there. In places where television standards other than N.T.S.C. standards are used, the frequencies are likely to be different than are referred to herein.

It is not necessary that the recording of signals using the recording systems of the present invention be carried out on magnetic tape and that the recorded information be arranged in skewed tracks on the tape. The recording may be made on a magnetic sheet or card or disc.

It will be understood by those skilled in the art that this invention is not limited to the specific embodiments described. Other embodiments and modifications may be made without departing from the true scope of the invention.

What is claimed is:

1. A system for reproducing a video signal recorded on a magnetic recording medium, said video signal containing at least a luminance signal which is balanced-modulated on a carrier signal including a synchronizing pulse signal portion having pulses of a larger amplitude than other signal portions, said system comprising:

magnetic transducer means for reproducing said video signal from said magnetic recording medium;
a synchronous detector for synchronously detecting said balanced-modulated luminance signal;
supply means to supply a reference carrier signal to said synchronous detector; and
control means to control the phase of said reference carrier signal, said control means comprising means connected to said transducer means for controlling the phase of said reference carrier signal continuously with a component of said reproduced video signal and during said synchronizing signal pulses of said modulated luminance signal.

2. A system according to claim 1; wherein said control means comprises:
carrier signal extracting means connected to said transducer means for extracting said carrier signal from said reproduced video signal; and
a variable frequency oscillator connected to said carrier signal extracting means for producing said reference carrier signal, said variable frequency oscillator being connected to said synchronous detector to supply said reference signal to said synchronous detector, and being phase-controlled by said carrier signal extracted by said extracting means.

3. A system according to claim 2; wherein said control means further comprises: a frequency multiplier connected to said extracting means for multiplying the frequency of said extracted signal and connected to said variable frequency oscillator to supply the frequency-multiplied signal thereto to control the phase of said varaible frequency oscillator with said frequency multiplied extracted signal.

4. A system for reproducing a video signal recorded in parallel tracks on a magnetic recording medium, said video signal containing at least the upper side-band component signal of a suppressed carrier, balanced-modulated luminance signal which includes synchronizing pulse signals, said suppressed carrier having a low frequency, said system comprising:
magnetic transducer means for reproducing said video signal from said magnetic recording medium;
a synchronous detector connected to said transducer means for synchronously detecting said balanced-modulated luminance signal; and
supply means connected to said synchronous detector to supply a reference carrier signal thereto, said supply means also being connected to said transducer means to receive said suppressed carrier signal therefrom continuously and during said syncronizing pulse signals of said modulated luminance signal for controlling the phase of said reference carrier signal.

5. A system according to claim 4; wherein said supply means comprises:
carrier signal extracting means connected to said transducer means for extracting said suppressed carrier signal from said reproduced video signal; and
a variable frequency oscillator for producing said reference carrier signal, said variable frequency oscillator being connected to said synchronous detector to supply said reference carrier signal to said synchronous detector, said variable frequency oscillator also being connected to said extracting means to be phase-controlled by said suppressed carrier signal extracted by said extracting means.

6. A system according to claim 5; wherein said supply means further comprises: a frequency multiplier connected between said extracting means and said variable frequency oscillator for supplying a frequency-multiplied suppressed carrier signal to said variable frequency oscillator to control the phase of said variable frequency oscillator.

7. A system according to claim 5; further comprising:
frequency converter means connected to said magnetic transducer means to frequency-convert said suppressed carrier of said balanced-modulated upper-sideband component signal to a substantially higher frequency in two sidebands; and
low pass filter means connected between said frequency converter means and said synchronous detector to pass a lower one of said two sidebands having said substantially higher suppressed carrier frequency from the output of said frequency converter means.

8. A system according to claim 7 wherein said variable frequency oscillator is connected to said frequency converter to supply a frequency converting signal to said frequency converter.

* * * * *